United States Patent [19]

Alameel et al.

[11] Patent Number: 4,861,134
[45] Date of Patent: Aug. 29, 1989

[54] OPTO-ELECTRONIC AND OPTICAL FIBER INTERFACE ARRANGEMENT

[75] Inventors: George M. Alameel, Duluth, Ga.; Alexander Petrunia, Madison, N.J.

[73] Assignee: American Telephone and Telegraph Company, AT&T Bell Laboratories, Murray Hill, N.J.

[21] Appl. No.: 213,003

[22] Filed: Jun. 29, 1988

[51] Int. Cl.⁴ .............................. G02B 6/36; H01J 5/16
[52] U.S. Cl. ........................... 350/96.20; 350/96.15; 350/96.16; 350/96.21; 350/96.22; 250/227
[58] Field of Search ............... 350/96.10, 96.11, 96.15, 350/96.16, 96.17, 96.23, 96.20, 96.21, 96.22; 250/227

[56] References Cited

U.S. PATENT DOCUMENTS

| | | | |
|---|---|---|---|
| 4,217,030 | 8/1980 | Howarth | 350/96.21 |
| 4,266,853 | 5/1981 | Hutchins et al. | 350/96.20 |
| 4,294,512 | 10/1981 | Logan | 350/96.20 |
| 4,332,435 | 6/1982 | Post | 350/96.20 |
| 4,428,645 | 1/1984 | Korbelak et al. | 350/96.20 |
| 4,432,604 | 2/1985 | Schwab | 350/96.21 |
| 4,461,537 | 7/1984 | Raymer | 350/96.20 |
| 4,697,874 | 10/1987 | Nozick | 350/96.23 |
| 4,702,551 | 10/1987 | Coulombe | 350/96.20 |
| 4,717,231 | 1/1988 | Dewez et al. | 350/96.20 |
| 4,722,585 | 2/1988 | Boyer | 350/96.20 |
| 4,792,203 | 12/1988 | Nelson et al. | 350/96.20 |
| 4,798,432 | 1/1989 | Becker et al. | 350/96.20 |
| 4,799,757 | 1/1989 | Goetter | 350/96.20 |
| 4,802,724 | 2/1989 | Fraize et al. | 350/96.20 |
| 4,805,979 | 2/1989 | Bossard et al. | 350/96.20 |
| 4,807,955 | 2/1989 | Ashman et al. | 350/96.20 |
| 4,812,004 | 3/1989 | Biederstedt et al. | 350/96.20 |

FOREIGN PATENT DOCUMENTS

| | | | |
|---|---|---|---|
| 0205363 | 2/1986 | European Pat. Off. | 350/96.23 X |
| 1339471 | 9/1987 | U.S.S.R. | 350/96.21 X |
| 2165661 | 4/1986 | United Kingdom | 350/96.20 X |

Primary Examiner—William L. Sikes
Assistant Examiner—Brian M. Healy
Attorney, Agent, or Firm—Jack S. Cubert

[57] ABSTRACT

An opto-electronic organizer on a printed wiring card includes a plurality of opto-electronic devices each having electrical leads and at least one optical fiber extending therefrom and an optical fiber channel in the form of a closed loop for directing optical fibers. The opto-electronic devices are attached to the optical fiber closed loop channel at predetermined locations therealong and the optical fibers extending from the devices are directed into the closed loop channel wherein they are selectively interconnected. The closed loop channel has first and second portions and at least one channel joining the first and second portions so that optical fiber passing therethrough can reenter the closed loop either clockwise or counterclockwise. The organizer is affixed to the printed circuit card in predetermined alignment whereby the electrical leads extending from the opto-electronic devices are connected to prescribed electrical elements on the printed circuit card.

15 Claims, 10 Drawing Sheets

OPTO-ELECTRONIC AND OPTICAL FIBER INTERFACE ARRANGEMENT

FIELD OF THE INVENTION

The invention relates to electro-optical systems and, more particularly, to arrangements for interconnecting optical and opto-electronic devices on printed circuit cards.

BACKGROUND OF THE INVENTION

Wide bandwidth lightwave communication systems using optical fiber transmission channels require converting outgoing information signals from electrical to lightwave form and conversion of incoming information signals from lightwave to electrical form at each terminal end of the channel. Opto-electronic termination equipment generally includes both electronic circuitry and an assembly of opto-electronic and optical devices interconnected by optical fibers. Optical fibers, however, are usually small in diameter, brittle and have transmission characteristics that may be adversely affected by splicing and bending beyond a prescribed minimum bend radius. Consequently, it is necessary to use special handling techniques to assure reliable interconnection without impairment of the lightwave signals.

In view of the difficulties present in connecting optical fibers to lightguide connectors and to opto-electronic devices, the optical signal portion of termination equipment has generally been separated from the printed circuit cards on which the electrical termination functions are performed. The separation allows adequate space needed for assembly and repair of high quality optical interconnections without interfering with automatic assembly of electronic components on the printed circuit cards. Where mixing of both optical and electrical functions are required on a printed circuit card, the card must be adapted to accommodate optical fiber interconnections by special mounting arrangements for the opto-electronic devices and optical connectors.

U.S. Pat. 4,461,537, issued to Jack D. Raymer et al. on July 24, 1984, discloses an opto-electronic device incorporated in a fiber optic connector assembly that includes an optical port, an optical lens and means for guiding a fiber end into alignment with the lens mounted on a printed circuit board. The arrangement uses a simple optical fiber structure on the printed circuit card that is adjusted to an only single opto-electronic conversion. The connector assembly, however, is not suitable for optical interconnections requiring a high degree of accuracy or for more complex optical interconnections such as used in communication systems.

Other arrangements incorporating both fiber optic and electronic components on a printed circuit card such as described in U.S. Pat. 4,217,030, issued to Louis E. Howarth on August 12, 1980, include only simple optical fiber interconnection patterns to avoid impairment of lightwave transmission characteristics. Thus, while intricate electrical conductor patterns are used to interconnect electronic components within a limited space on a printed circuit card, only relatively simple and direct connections to optical fibers are permitted.

U.S. Pat. 4,432,604, issued to Richard E. Schwab on February 21, 1985, describes a self-adjusting fiber optic connector assembly having optical fibers extending therefrom to opto-electronic devices mounted on a printed circuit card wherein the optical fiber and electrical connections are made on the board. The self-adjusting connectors permit changes in placement of optical fibers on a printed circuit card but are not adapted to complex optical fiber arrangements and do not permit controlled looping of interconnecting optical fibers. It is an object of the invention to provide an improved opto-electronic assembly arrangement that permits automatic assembly of relatively complex optical fiber interconnections on a printed circuit card.

SUMMARY OF THE INVENTION

The invention is directed to an opto-electrical organizer having a closed loop trough for retaining optical fibers. Openings at different locations along the closed loop direct a plurality of optical fibers into the closed loop trough. The optical fibers are selectively interconnected within the closed loop trough which has first and second portions. At least one optical fiber retaining channel forms a passageway for optical fibers between the first and second portions so the paths of the optical fibers in the closed loop trough can be reversed between clockwise and counterclockwise directions.

DETAILED DESCRIPTION

Figure 1:
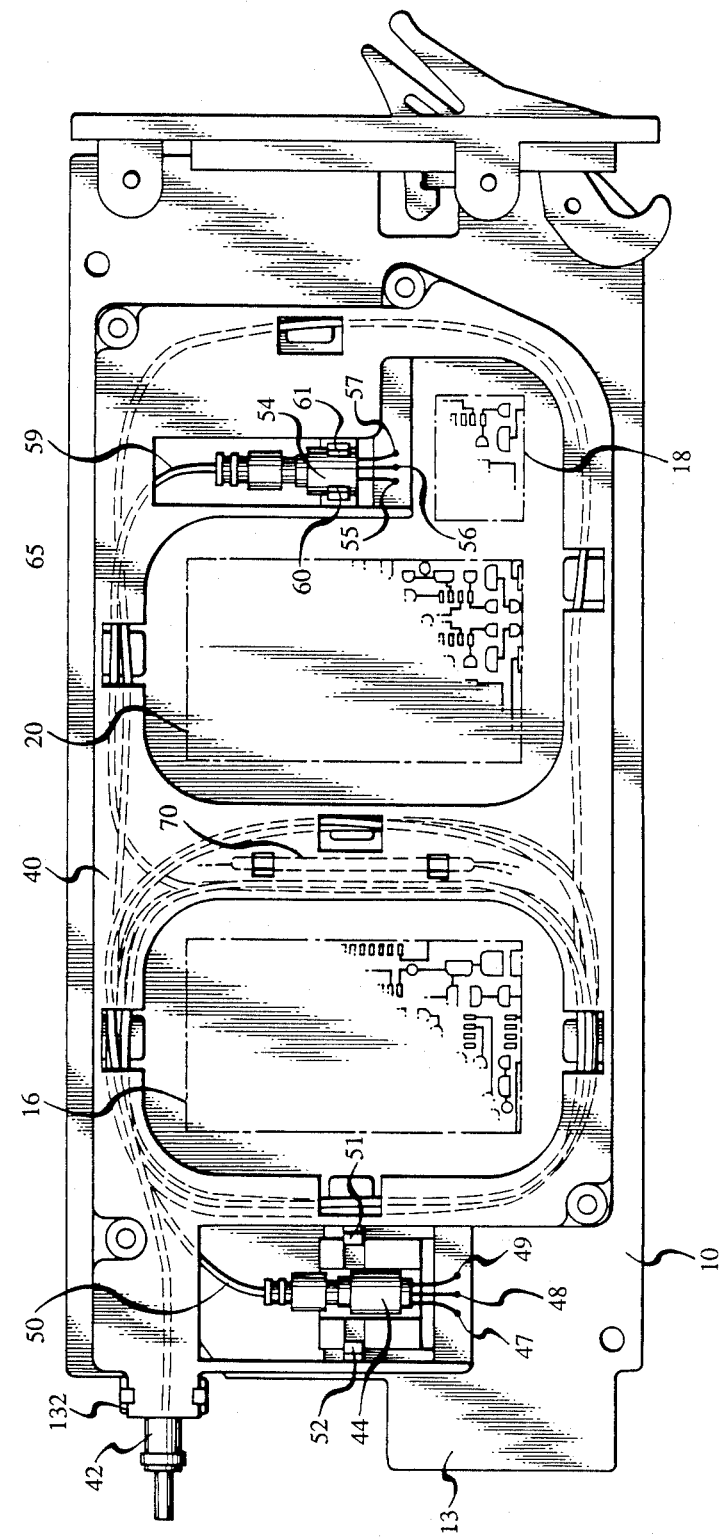
FIG. 1 depicts an optical organizer illustrative of the invention mounted on a printed circuit board.

FIG. 1 shows a front perspective view of an optical organizer 40 affixed to a printed circuit card 10 that is illustrative of the invention. The assembly of the organizer and printed circuit card is adapted to perform opto-electronic conversions. Referring to FIG. 1, printed circuit card 10 retains and interconnects electronic components which perform the electrical filtering, signal amplification and electrical and optical connections associated with opto-electronic coupling. Card 10 comprises electrical connection section 13, amplifier and driver section 16 for supplying electrical pulses to lightwave signal producing device 44, low level electronic receiver section 18 which receives electrical signals from lightwave to electrical signal conversion device 54, and receiver amplifier section 20. Optical organizer 40 retains and interconnects opto-electronic and optical components adapted to convert a lightwave signal obtained from an simultaneous two-way optical fiber transmission medium external to the card to an electrical signal and to convert an electrical signal from a source terminal to a lightwave signal for application to the simultaneous two way optical fiber transmission medium.

The lightwave signal producing device 44 of FIG. 1 which may be a semiconductor laser is removably attached to optical organizer 40 by the clamping structure including clamp sections 51 and 52 adjacent to connector section 13. Device 44 has three electrical leads 47, 48 and 49 extending from one end bent at right angles for coupling to driver section 16 of the card and an output optical fiber 50 extending outward from its opposite end parallel to the adjacent surface of card 10. Lightwave to electrical converter 54 which may be a photoelectric device for lightwave signals is removably attached to organizer 40 by the clamp structure including clamp sections 60 and 61 adjacent to low level receiver section 18 of card 10. Photoelectric device 54 of FIG. 1 has three electrical leads 55, 56 and 57 extending from one end which are bent at right angles to connect to the input of receiver section 18 and has an input optical fiber 59 extending from the other end parallel to the adjacent surface of card 10.

In addition to opto-electronic devices 44 and 54, the optical portion of the optical coupler of FIG. 1 also includes optical fiber connection device 42 and optical splitter 70. The optical splitter, which may for example be of the well known fuse tapered type, is operative as a directional coupler to couple incoming lightwave signals from a two way lightwave transmission channel to photoelectric device 54 via optical connection device 42 and to couple outgoing lightwave signals from semiconductor laser 44 to the lightwave transmission channel. Connector 42 couples lightwave signals received from the two way lightwave transmission channel to optical splitter 70 which then directs a portion of the received lightwave signals to photo conductor device 54 and directs lightwave signals generated in semiconductor laser 44 to the two way lightwave transmission channel by way of optical connection device 42.

Figure 2:
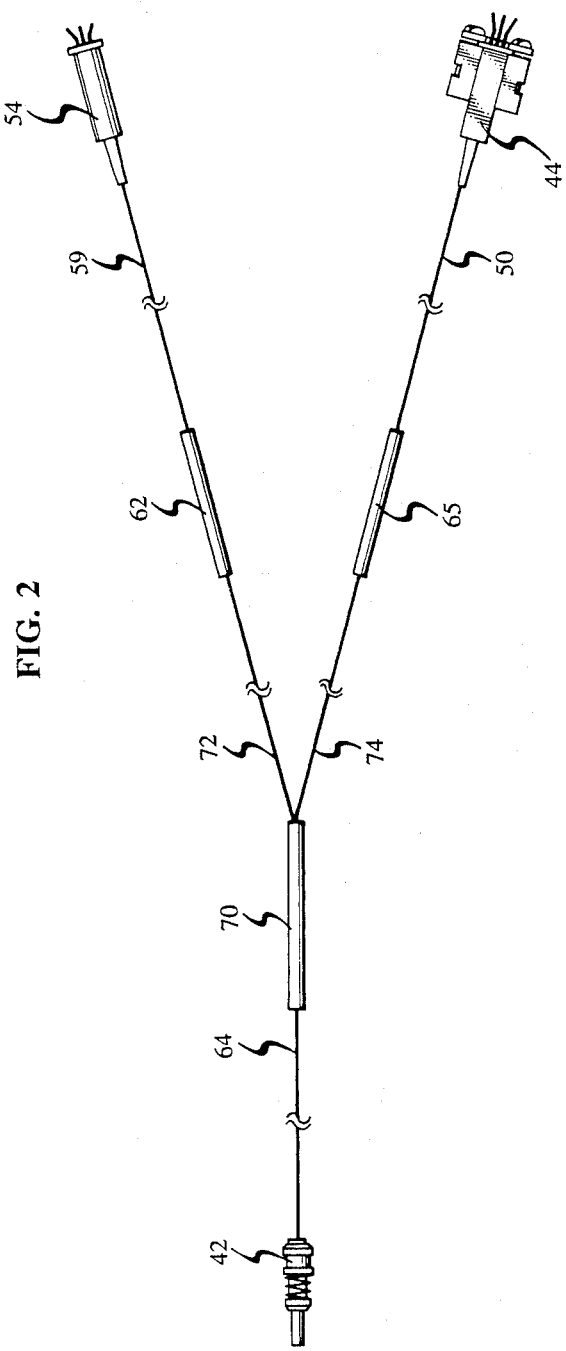
FIG. 2 shows an assembly of optical and opto-electronic components interconnected by optical fibers adapted for insertion into the organizer of FIG. 1.

FIG. 2 shows a perspective view of laser 44, photodetector 54, connection device 42 and splitter 70 interconnected by optical fibers prior to insertion into organizer 40. Laser 44 has optical fiber 50 extending therefrom. Light detector 54 has optical fiber 59 extending therefrom. Each of these fibers has a length in the order of one meter. Optical splitter 70 has optical fibers 72 and 74 extending from one end and one optical fiber 64 extending from the opposite end. Each of the optical splitter fibers is also of the order of one meter in length. Optical fiber 64 is attached directly to connection device 42. Optical fiber 59 is interconnected with fiber 72 by splice device 62 while fiber 50 from semiconductor laser 44 is connected to fiber 74 from splitter 70 by splice device 65. The splice devices may be of the fusion or mechanical types. Since the transmission characteristics are dependent on the splicing interfaces between fibers, the relatively long lengths of optical fibers are needed to permit resplicing so that acceptable lightwave transmission characteristics are assured. Advantageously, the organizer of FIG. 1 accommodates the lengths of interconnecting optical fiber on the restricted area of the printed circuit card without interference with electrical components mounted on the card.

Figure 3:
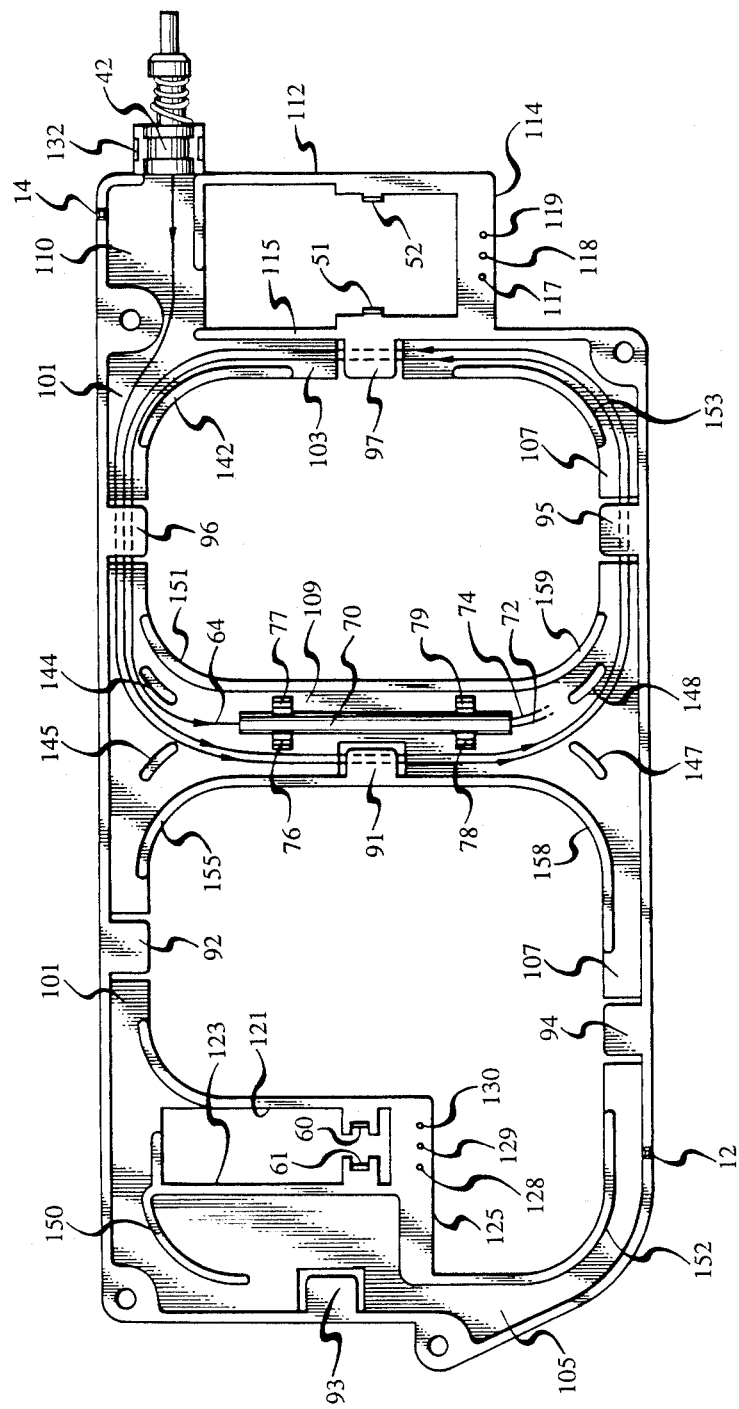
FIG. 3 shows a front view of the organizer of FIG. 1 with an optical connection, an optical splitter and interconnecting optical fiber of FIG. 2 mounted therein.

FIG. 3 shows a front view of optical organizer 40 into which the portion of the assembly of FIG. 2 including optical connection device 42, optical splitter 70 and optical fiber 64 interconnecting the optical connection device and the optical splitter shown in FIG. 2 is inserted. The organizer comprises a closed trough loop around the printed circuit card edges and a straight trough section connecting opposite sides of the trough loop. Structures to hold the optical and opto-electronic devices connected by optical fiber are affixed to the trough loop and the traversing trough at predetermined positions so that electrical connections therefrom are aligned with prescribed positions in the printed circuit card. Two or more alignment pins e.g. 12 and 14 on the organizer are adapted for insertion into alignment apertures on the printed circuit card to automate the placement of the optical assembly on the printed circuit card.

The trough loop includes upper channel 101, side channels 103 and 105 and lower channel 107. Cross channel 109 connects the middle portion of upper channel 101 to the middle portion of lower channel 107. Channel 110 extending from the right side of upper channel 101 includes a structure at the end thereof retaining optical connection device 42 in a preassigned position at one end of the organizer. Cross channel 109 includes clamp elements 76, 77, 78 and 79 which hold optical splitter 70 in place so that optical fibers extending therefrom may be directed into upper channel 101 and lower channel 107. The rectangular structure including bar member 112 extending downward from one side of channel 110 parallel to channel 103 and bar member 114 extending perpendicularly from side 115 of channel 103 is adapted to retain light transmitter device 44 by means of opposing clamping elements 51 and 52. Electrical leads 47, 48 and 49 from the transmitter device are inserted through apertures 117, 118 and 119 or bar 114 which apertures are aligned with corresponding apertures in the printed wiring pattern on card 10 shown in FIG. 1 during assembly of the organizer on the printed circuit card.

Figure 7:
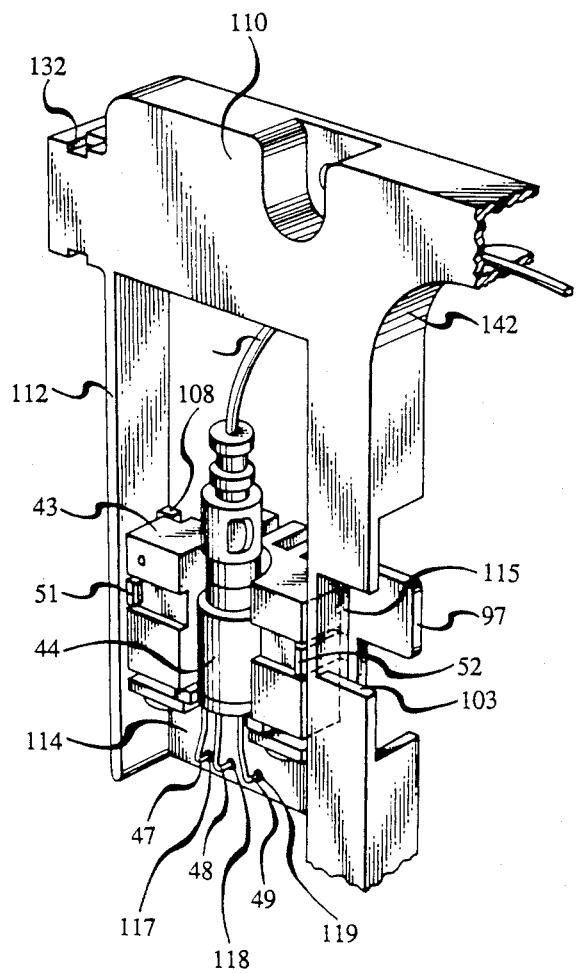
FIG. 7 shows a partial view in perspective illustrating the mounting of the opto-electronic transmitter in the optical organizer of FIG. 1.

The rectangular structure for retaining transmitter device 44 is shown in greater detail in FIG. 7. In FIG.7, transmitter device 44 and its heat sink block 43 are held in place between wall 115 of channel 103 and bar 112 by hook ended clamp elements 51 and 52. Clamp 51 is attached to bar 112 by ledge 108 on the rearward side of bar 112, and the clamp extends frontward along bar 112 to its hook shaped end. Clamp 52 is similarly attached to the outside of channel 103 by a ledge not shown and extends frontward parallel to the wall 115. After leads 47, 48 and 49 are passed through apertures 117, 118 and 119, the assembled transmitter device 44 and its heat sink block 43 are inserted between clamp elements 51 and 52. These clamp elements are separated from bar 112 and the side of channel 103. They yield to allow passage of the transmitter device and heat sink assembly between bar 112 and wall 115 but return to clamp heat sink block 43 as shown in FIG. 7.

Figure 8:
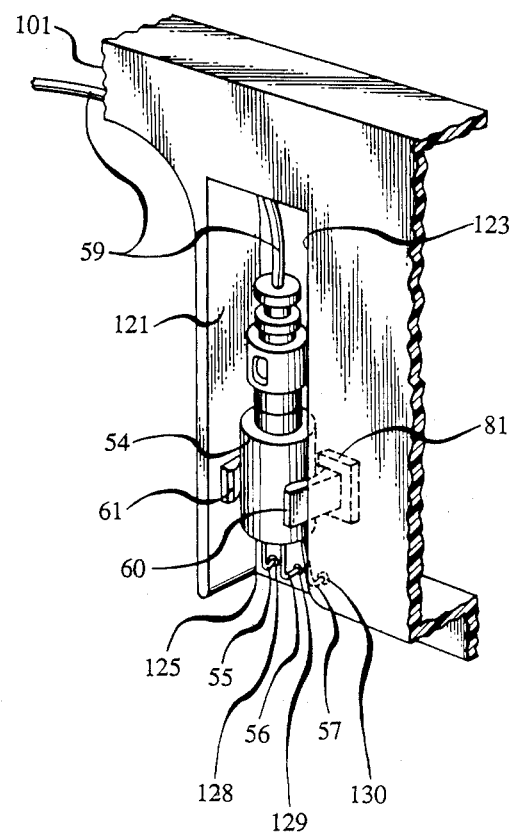
FIG. 8 shows a partial view in perspective illustrating the mounting of an opto-electronic type receiver device in the optical organizer of FIG. 1.

Receiving device 54 is placed in a prescribed position by the retaining structure formed between bar 121, bar 123 extending from channel 101 and bar 125 extending from channel 105 in FIG. 3. Apertures 128, 129 and 130 in bar member 125 are adapted to receive electrical leads 55, 56 and 57 on receiving device 54. Apertures 128, 129 and 130 are located so that the receiving device leads are automatically inserted at the preassigned terminal holes of receiving circuit 18 on card 10 when the organizer and the card are brought into alignment. The receiving device retaining structure is shown in greater detail in FIG. 8. In FIG. 8, receiving device 54 is held in place between bars 121 and 123 by hook ended clamp elements 60 and 61. Clamp 61 is attached to bar 123 via bracket 81 and clamp 60 is similarly attached to bar 121 by a bracket (not shown). Clamp element 61 extends frontward from bracket 81 parallel to bar 123 and clamp element 60 extends frontward parallel to bar 121. After leads 56, 57 and 58 are passed through apertures 128, 129, and 130, receiving device 54 is inserted between clamp elements 60 and 61. Since the clamp elements are spaced from bar 121 and bar 123, they yield to allow passage of the receiving device between bars 121 and 123 and return to hold the receiving device as shown in FIG. 8.

Figure 6:
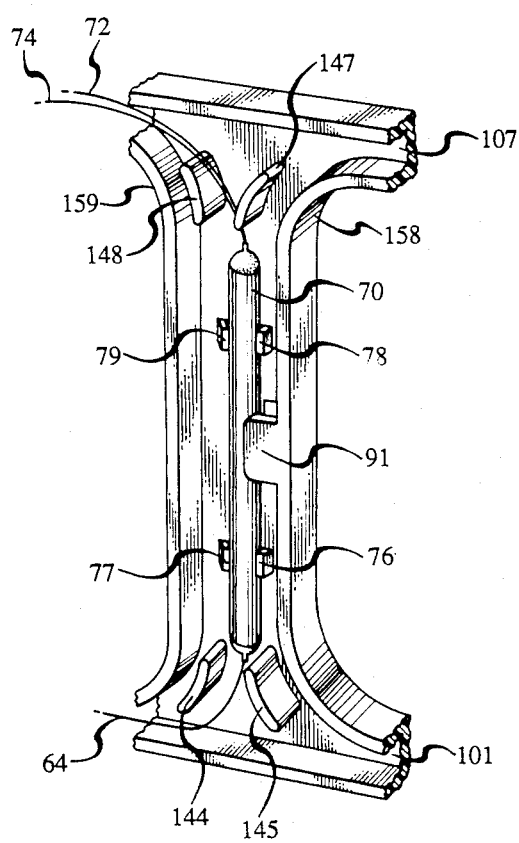
FIG. 6 shows a partial view in perspective illustrating the placement of an optical splitter in the optical organizer of FIG. 1.

The arrangement for retaining optical splitter 70 in its predetermined location in cross channel 109 is shown in greater detail in FIG. 6. Referring to FIG. 6, opposing clamp elements 76 and 77 yield outwardly to receive one end portion of optical splitter 70 while opposing clamp elements 78 and 79 yield outwardly to receive the other end portion of the optical splitter. The two sets of opposing clamp elements partially enclose splitter 70 to affix the splitter in its predetermined location. Splitter 70 is positioned in the right portion of cross channel 109 so that a large section of the cross channel is open for passage therethrough of interconnecting optical fibers. Tab 91 extends over the fiber passageway in channel 109 whereby the interconnecting optical fiber passing through the channel is confined therein.

Figure 9:
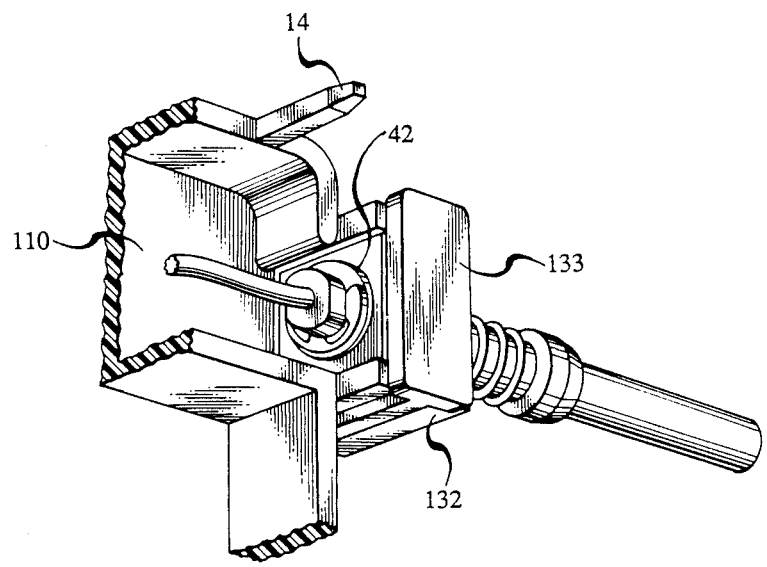
FIG. 9 shows a partial view in perspective illustrating the mounting of the optical connection device in the optical organizer of FIG. 1.

Optical connection device 42 is positioned on organizer 40 by rectangular shaped retaining frame 132 as shown in FIG. 3. The retaining frame arrangement is shown in greater detail in FIG. 9. Referring to FIG. 9, retaining frame 132 is affixed to the end of channel 110 remote from upper channel 101. The retaining frame has a U-shaped passageway therethrough which passageway receives optical connection device 42 from channel 110. Retaining clip 133 grips the retaining frame 132 to hold the device 42 firmly in its predetermined location.

As shown in FIG. 3. channels 101 and 103 are joined be curved channel section 142 which maintains a minimum radius of curvature of optical fiber passing therethrough. Curved channel section 150 restricts the radius of curvature of optical fibers at the intersection between channels 101 and 105. The intersections of channels 105 and 107, and channels 107 and 103 are joined by curved portions 152 and 153, respectively, so that the minimum radius of curvature of optical fibers is maintained. Cross channel 109 is joined to upper channel 101 by curved sides 151 and 155 and includes curved guides 144 and 145 so that optical fiber can be directed into channel 101 clockwise or counterclockwise within the minimum radius requirements. Similarly, the intersection of channel 109 and lower channel 107 includes curved sides 158 and 159 and curved guides 147 and 148 to assure that optical fiber entering channel 107 from cross channel 109 do not violate the bend radius requirements.

Organizer 40 is made of Polyethersulfone or other suitable material known in the art and sized to fit on printed circuit card so as not to interfere with the electrical circuit arrangements mounted on the printed circuit card and to align the electrical leads of the optoelectronic components with the printed wiring pattern of the printed circuit card. The requirements of the printed circuit card control the placement of the optoelectronic and optical devices on organizer 40 and the paths of the interconnecting optical fiber are adapted to conform to the location of these devices. Optical connection section 42 is placed at the electrical connection end of the organizer above electrical connection section 13 on FIG. 1 so that insertion and removal of the assembled printed circuit card does not require movement of the optical fiber transmission line and electrical and lightwave connections are made simultaneously at one end of the printed circuit card. Semiconductor laser 44 is mounted near the electrical connector end of the organizer, while photoconductor diode 54 is mounted on the opposite side of the organizer to minimize pickup by the photoconductor of high level electrical pulses applied to the laser. The locations of the semiconductor laser and the photoconductor diode are coordinated with the placement of electrical circuitry on the printed wiring card to provide appropriate electronic interfaces. Thus in addition to the restrictions imposed by placement of splicing devices and multiple turns of fiber, it is also necessary to direct the interconnection optical fibers through the organizer channels to provide the required connection between prelocated devices without violating the fiber bend radius restrictions.

In order to accommodate the foregoing requirements, organizer 40 includes an oval-shaped trough including channels 101, 103, 105 and 107 in which optical fibers can be directed either in the clockwise or counterclockwise direction. In the event that a device connected to one end of the fiber requires the fiber be directed clockwise in the trough but the device connected to the other end of the fibers requires the fiber to be directed counterclockwise in the trough, it is necessary to reverse the direction of the fiber without departing from the minimum bend radius requirement. Cross channel 109 partitions the closed loop trough into two U shaped portions. In accordance with the invention, channel 109 extending between upper channel 01 and lower channel 107 permits a clockwise or counterclockwise directed optical fiber entering cross channel 109 to exit the cross channel in either the clockwise or the counterclockwise direction. In this way, optical interconnections can be made independent of the placement or orientation of optical or opto-electronic devices.

Figure 4:
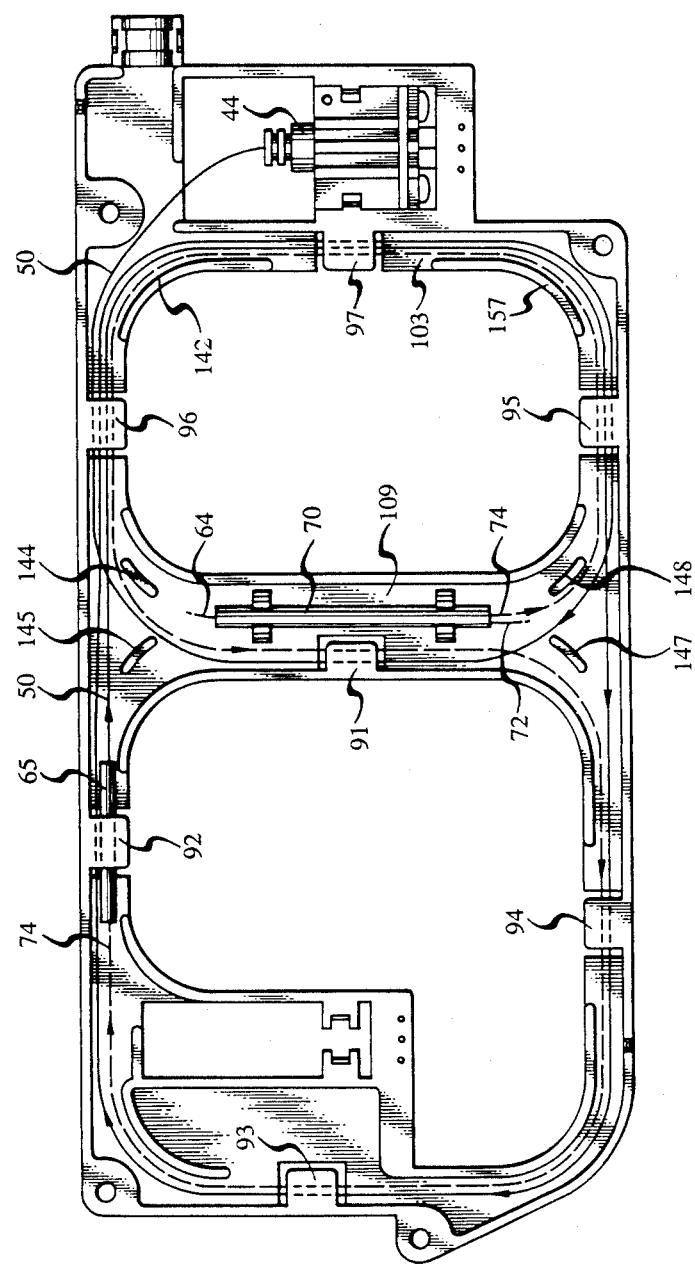
FIG. 4 shows a front view of the organizer of FIG. 1 with the optical splitter, an opto-electronic type light transmitter device and interconnecting optical fiber of FIG. 2 mounted therein.
Figure 5:
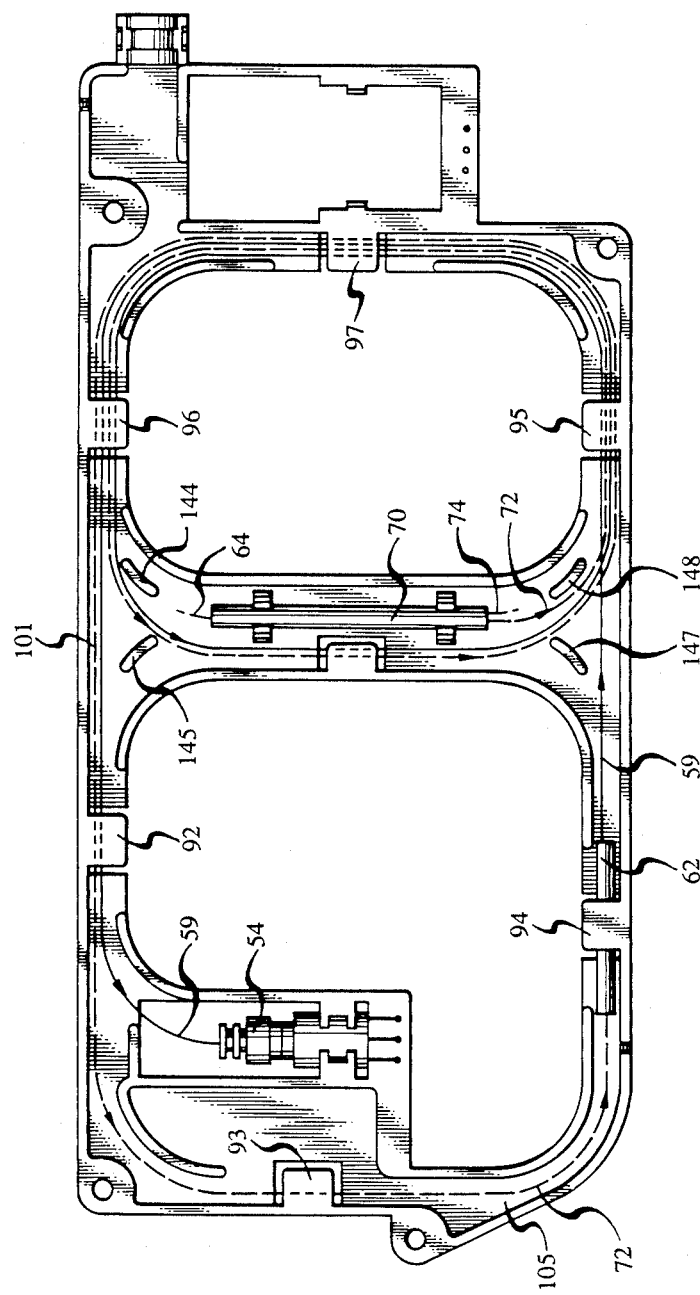
FIG. 5 shows a front view of the organizer of FIG. 1 with the optical splitter, an opto-electronic type light receiving device and interconnecting optical fiber of FIG. 2 mounted therein.

The channels of organizer 40 are open on one side to permit insertion of fiber and splicing devices therein. The height of the channel sides must at least accommodate the multiple loops of interconnecting optical fibers 50, 59, 64, 72 and 74 and fusion splicing devices 62 and 65 but not so large as to interfere with other apparatus used with the printed circuit card in the optical transmission terminal assembly. Since fusion splicing devices 62 and 65 have much larger cross-sections than either jacketed or unjacketed optical fibers, they are placed in channel portions having a minimum number of optical fibers therein. As aforemention, fusion splicing device 65 is generally positioned in the left-hand portion of channel 101 as shown in FIG. 4 while fusion splicing device 62 is generally positioned in the left portion of channel 107 as shown in FIG. 5. The number of optical fibers traversing the portions of channels 10 and 107 having splicing devices therein is limited to provide space for the splicing devices while multiple turns of optical fibers 50, 59, 64, 72 and 74 are placed around the loop including the other portions of channels 101 and 107 and cross channel 109 which has no splicing devices.

After the components shown in FIG. 2 are interconnected by the splicing arrangements shown therein, the assembly of optical fiber interconnected optical and opto-electronic components is inserted into organizer 40. FIG. 3 illustrates the placement of optical fiber 64 of the optical assembly of FIG. 2 into the organizer. Optical connection device 42 is first inserted into retaining frame structure 132. The unjacketed optical fiber 64 from optical connection device 42 enters channel 101 from channel extension 110, and one or more turns of the fiber are inserted counterclockwise into the loop including the U shaped portion formed by channel 101, channel 107 and channel 103 and cross channel 109. Optical fiber 64 from the connection device enters channel 109 from upper channel 101 between guides 144 and 145. Optical splitter 70 at the other end of fiber 64 is then clamped in place in cross channel 109 by clamp element pairs 76 and 77, and 78 and 79.

After optical splitter 70 is placed in cross channel 109 of the organizer, the portion of the optical assembly connecting optical splitter 70 with transmitter laser device 44 including unjacketed optical fiber 74, fusion splice 65 and jacketed fiber 50 interconnecting fusion splice 65 and laser device 44 is placed in the organizer as shown in FIG. 4. Referring to FIG. 4, fiber 74 exiting cross channel 109 enters lower channel 107 between curved guides 147 and 148 and the outer wall of channel 107. Fiber 74 is wound counter clockwise one or more times around the loop including the right portion of channel 107, side channel 103, upper channel 101 and cross channel 109 and is retained under tabs 95, 97, 96 and 91. Fiber 74 enters channel 109 counterclockwise between curved guides 144 and 145.

Fiber 74 is then inserted clockwise into the left portion of lower channel 107 to traverse the U shaped portion of the closed loop trough including the left portion lower channel 107, side channel 105 and the left portion of upper channel 101 so that fusion splice device 65 is placed in channel 101 underneath tab 92. Alternatively, fusion splice device 5 may be placed underneath tab 93 in side channel 105. The placement of the fusion splice device in either channel 101 or channel 105 is dependent on the length of fiber 74. In either location, it may be necessary to route fiber 74 differently so that the interconnection is maintained without excessive slack in the fiber. This is so because the length of fiber 74 depends on the point at which a successful splice is made. After fusion splice 65 is in place, optical 50 is inserted into upper channel 101 and directed around the loop including the U shaped portion formed by upper channel 101, side channel 103, lower channel 107 and cross channel 109 one or more times to exit upper channel 101 at channel extension 110. Transmitter device 44, at the other end of fiber 50, is then inserted into its retaining structure as previously described.

Following the insertion of transmitter device 44 on the organizer, optical fiber 72 between splitter 70 and fusion splice device 62, splice device 62 and fiber 59 interconnecting splice device 62, and receiver device 54 is inserted into the organizer so that fiber 72 enters lower channel 107 between guides 147 and 148 to run counter clockwise in the loop including channels 107, 103 and 101 and cross channel 109 one or more times as shown in FIG. 5. Fiber 72 then enters the left portion of upper 101, passes through side channel 105 into the left portion of lower channel 107 so that fusion splice 62 is placed in the left portion of channel 107 underneath tab 94. In the event the length of fiber 72 does not permit placement of splice device 62 underneath tab 94, it may be placed in side channel 105 underneath tab 93. A different routing of fiber 72 may be required depending on its length after the splices are made in the optical assembly shown in FIG. 2.

The end of optical fiber 59 extending from fusion splice device 62 is passed through to the right portion of lower channel 107 so that it traverses the loop including lower channel 107, side channel 103, upper channel 101 and cross channel 109 one or more times. Fiber 59 exits this loop at the left portion of upper channel 101 and receiver device 54 at the other end of fiber 59 is then inserted into its retaining structure on organizer 40 as previously described. The aforementioned method of placement of the optical assembly of FIG. 2 into organizer 40 is appropriate if the lengths of the optical fibers shown in FIG. 2 are not appreciably modified when the fibers are interconnected via fusion splice devices 62 and 65. These optical fiber lengths may be changed significantly to obtain the desired light wave transmission characteristics by resplicing or to effect a repair or replacement of opto-electronic or optical components. If such changes in optical fiber lengths are made, the paths of the interconnecting optical fibers must be altered so that the opto-electronic and optical devices fit in their retaining structures. Such path alterations may include clockwise-to-counterclockwise and counterclockwise-to-clockwise direction changes in the fiber paths. The inclusion of at least one cross channel connecting the sections of the outer channel loop in accordance with the invention permits such direction alterations to be readily made.

Figure 10:
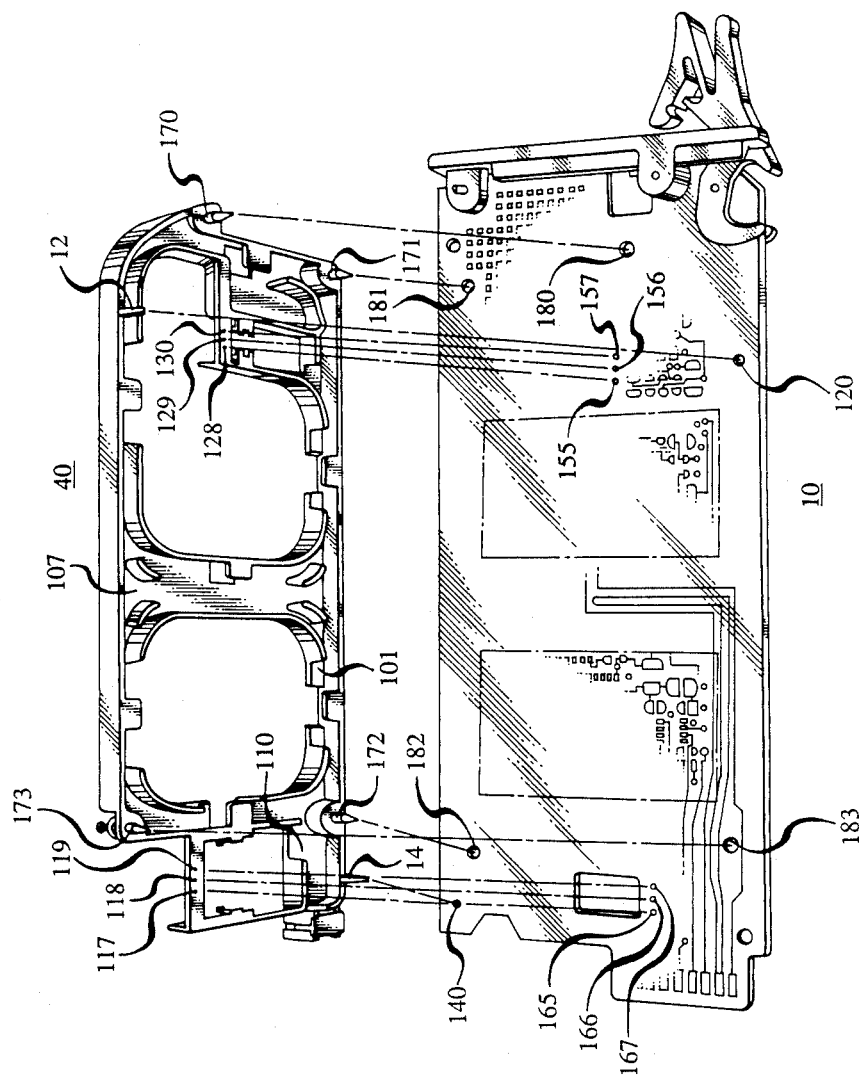
FIG. 10 shows an exploded view of the optical organizer and the printed circuit card illustrating the mounting of the organizer on the printed circuit card.

FIG. 10 shows a perspective view of the component side of printed circuit board 10 and organizer 40 to illustrate the placement of the organizer on the printed circuit board. For clarity, devices 42, 44, 54, and 70 of FIG. 1 are not shown in FIG. 10. After the assembly of interconnected optical and opto-electronic devices is inserted in organizer 40, electrical leads 47, 48 and 49 are positioned through apertures 117, 118 and 119, and electrical leads 55, 56 and 57 are positioned through apertures 128, 129 and 130 shown in FIG. 10. Alignment pin 12 extending from the outer sidewall of the right portion of channel 107 and alignment pin 14 extending from the outer sidewall of channel 110 are adapted to be inserted into alignment apertures 120 and 140, respectively, in printed circuit board 10. Once alignment pins 12 and 14 are placed in printed circuit board apertures 120 and 140, apertures 117, 118 and 119 are aligned with terminal board apertures 165, 166 and 167 and apertures 128, 129 and 130 are aligned with terminal board apertures 155, 156 and 157.

Electrical leads 47, 48 and 49 extending through apertures 117, 118 and 119 and electrical leads 55, 56 and 57 extending through apertures 128, 129 and 130 are made shorter than alignment pins 12 and 14 so that insertion of the alignment pins assure placement of electrical leads 47, 48 and 49 into terminal board apertures 165, 166 and 167 and placement of electrical leads 55, 56 and 57 into terminal board apertures 155, 156 and 157. Consequently, affixing organizer 40 to board 10 using the alignment arrangement shown in FIG. 10 automatically inserts the electrical leads of the opto-electronic devices in organizer 40 into the electrical circuitry of printed circuit board 10. Advantageously, the construction of the organizer in accordance with the invention permits automated assembly of the organizer and printed circuit card. Expansion type pin structures 170, 171, 172 and 173 on organizer 40 are adapted as is well known in the art to be inserted into apertures 180, 181, 182 and 183, respectively, in printed circuit card 10 to clamp the organizer in its aligned position to the printed circuit card.

The invention has been described with reference to an illustrative embodiment thereof. It is apparent, however, to one skilled in the art that various modifications and changes may be made without departing from the spirit and scope of the invention.

What is claimed is:

1. An optical fiber organizing arrangement comprising:
   a closed loop trough for retaining optical fibers;
   means for directing a plurality of optical fibers into the closed loop trough at different locations therealong;
   means disposed in said closed loop trough for selectively interconnecting the optical fibers;
   said closed loop trough having first and second portions and at least one optical fiber retaining channel forming a passageway for optical fibers between the first and second portions to change the direction of optical fiber passing therethrough between clockwise and counter-clockwise directions,
   said each of the first and second closed loop trough portions comprises a generally U shaped portion having first and second ends,
   the first ends of the U shaped portions being joined together and the second ends of the U shaped portions being joined together to form the closed loop; and
   said at least one optical fiber retaining channel forming an optical fiber passageway between the first and second U shaped portions.

2. An optical fiber organizing arrangement according to claim 1 wherein said means for selectively interconnecting the optical fibers are disposed in one of the first and second U shaped portions and a plurality of loops of the retained optical fiber are disposed in the passageway formed by the other of the first and second U shaped portions and the at least one channel between the first and second U shaped portions.

3. An optical fiber organizing arrangement according to claim 1 wherein said means for selectively interconnecting the optical fibers comprises means for abutting an end of one optical fiber an end of another optical fiber.

4. An optical fiber organizing arrangement according to claim 3 wherein said abutting means comprises a fusion splicing device.

5. An optical fiber organizing arrangement according to claim 3 wherein said abutting means comprises a mechanical splice device.

6. An optical fiber organizing arrangement comprising:
   a closed loop trough for retaining optical fibers;
   means for directing a plurality of optical fibers into the closed loop trough at different locations therealong;
   means disposed in said closed loop trough for selectively interconnecting the optical fibers;
   said closed loop trough having first and second portions and at least one optical fiber retaining channel forming a passageway for optical fibers between the first and second portions to change the direction of optical fiber passing therethrough between clockwise and counter-clockwise directions,
   a plurality of opto-electronic devices each having at least one electrical lead and at least one optical fiber extending therefrom;
   means for affixing each of the plurality of opto-electronic devices to said closed loop trough at a predetermined location therealong; and
   said means for directing a plurality of optical fibers into the closed loop trough comprises an opening in said closed loop trough at each predetermined location for directing the at least one optical fiber from one of said opto-electronic devices into said closed loop trough.

7. An optical fiber organizing arrangement according to claim 6 further comprising:
   a printed circuit card including apertures at prescribed locations for receiving electrical leads from said opto-electronic devices and a plurality of apertures for positioning said closed loop trough with respect to the printed circuit card;
   said closed loop trough further comprising a plurality of pins extending therefrom for insertion into the positioning apertures on the printed circuit card;
   said pins extending from the closed loop being longer than the opto-electronic device electrical leads to guide the opto-electronic device electrical leads into the prescribed location receiving apertures on the printed circuit card.

8. An optical interconnection arrangement for mounting on a printed circuit card comprising:
   one or more opto-electronic devices, each device having at least one electrical lead and at least one optical fiber extending therefrom;
   one or more optical devices each having at least one optical fiber extending therefrom;
   a plurality of devices for selectively interconnecting the optical fibers extending from the one or more opto-electronic devices and the one or more optical devices;
   a structure for restricting the plurality of selectively interconnected optical fibers to a predetermined region;
   means for retaining each of the one or more opto-electronic devices at predetermined locations on the optical fiber restricting structure;
   the optical fiber restricting structure comprising a closed loop channel for directing one or more of the plurality of interconnected optical fibers clockwise around the closed loop and for directing other of the plurality of interconnected optical fibers counter clockwise around the closed loop; and
   means for affixing said optical fiber restricting structure to said printed circuit card to position the electrical leads of the opto-electronic devices at prescribed locations on said printed circuit card.

9. An optical interconnection arrangement for mounting on a printed circuit card according to claim 8 wherein:
   the means for affixing the optical fiber restricting structure to said printed circuit card comprises a plurality of pin elements extending from the optical fiber restricting structure at prescribed locations;

the printed circuit card includes a plurality of apertures each for receiving one of said restricting structure pin elements at prescribed locations on the printed circuit card and one or more apertures for receiving said opto-electronic device electrical leads;

said restricting structure pin elements directing the restricting structure into a prescribed position on said printed circuit card to guide the opto-electronic device electrical leads into the opto-electronic device electrical lead receiving apertures.

10. An optical interconnection arrangement for mounting on a printed circuit card according to claim 9 wherein the restricting structure pin elements are longer than the opto-electronic electrical leads to position the opto-electronic device electrical leads in alignment with the printed circuit card electrical lead receiving apertures.

11. An optical interconnection arrangement for mounting on a printed circuit card according to claim 10 wherein said closed loop channel comprises first, second, third and fourth channels, the third channel being joined to each of the first and second channels by a curved passage and the fourth channel being joined to each of the first and second channels by a curved passage;

12. An optical interconnection arrangement for mounting on a printed circuit card according to claim 11 wherein:
    said one or more opto-electronic devices include
    a first device for converting electrical signals into lightwave signals having a plurality of electrical leads and at least one optical fiber extending therefrom into said closed loop channel; and
    a second device for converting lightwave signals into electrical signals having a plurality of electrical leads and at least one optical fiber extending therefrom into said closed loop channel;
    the first opto-electronic device being affixed to said first channel and the optical fiber extending therefrom entering into the closed loop channel in one of the clockwise or counterclockwise directions;
    the second opto-electronic being affixed to said second channel and the optical fiber extending therefrom entering into the closed loop channel in the other of the clockwise or counterclockwise directions;
    said optical devices include
    an optical fiber connection device having an optical fiber extending therefrom; and
    an optical coupler having a plurality of optical fibers extending therefrom;
    means for attaching each of said optical fiber connection device and said optical coupler to said closed loop optical fiber channel at a predetermined location therealong.

13. An optical interconnection arrangement for mounting on a printed circuit card according to claim 8, 9, 10, 11, and 12 wherein:
    the closed loop channel of the optical fiber restricting structure comprises first and second sections; and
    said optical fiber restricting structure further comprises at least one channel interconnecting the first and second sections for changing the direction of the optical fibers in said closed loop channel between a clockwise orientation and a counterclockwise orientation.

14. An arrangement for converting a lightwave signal incoming from an lightwave channel to an electrical signal and for converting an electrical signal to a lightwave signal on said lightwave channel comprising:
    a circuit board having a transmitting circuit and a receiving circuit mounted thereon;
    an optical fiber connection device for coupling light wave signals between the circuit board and the lightwave channel;
    a first device for converting lightwave signals to electrical signals having one or more electrical leads and an optical fiber extending therefrom for receiving lightwave signals and means for applying electrical signals corresponding thereto to the receiving circuit;
    a second device for converting electrical signals to lightwave signals having one or more electrical leads for receiving electrical signals from said transmitting circuit and an optical fiber extending therefrom for supplying lightwave signals responsive thereto;
    an optical splitter having first, second and third optical fibers extending therefrom for coupling light wave signals from the optical connection device to the first device and for directing lightwave signals from the second device to the connection device; and
    an optical fiber splicer for connecting the first optical fiber to the optical fiber extending from the first device;
    an optical fiber splicer for connecting the second optical fiber to the optical fiber extending from the second device;
    a closed loop trough mounted on said circuit board for retaining the optical fibers coupling said first device, said second device, said optical splitter device and said connection device; and
    a plurality of means extending from the closed loop trough for positioning the closed loop trough on the circuit board to guide the electrical leads of the first and second devices into predetermined positions on the circuit board.

15. An arrangement for converting a lightwave signal incoming from an lightwave channel to an electrical signal and for converting an electrical signal to a lightwave signal on said lightwave channel according to claim 14 wherein said closed loop trough includes first and second portions and at least one section connected between said first and second portions for changing the direction of the optical fibers in said trough between a clockwise orientation and a counterclockwise orientation.

* * * * *